(12) United States Patent
Yamamoto et al.

(10) Patent No.: US 11,294,090 B2
(45) Date of Patent: Apr. 5, 2022

(54) MARKER DETECTION SYSTEM AND MARKER DETECTION METHOD

(71) Applicant: AICHI STEEL CORPORATION, Tokai (JP)

(72) Inventors: Michiharu Yamamoto, Tokai (JP); Tomohiko Nagao, Tokai (JP); Hitoshi Aoyama, Tokai (JP)

(73) Assignee: AICHI STEEL CORPORATION, Tokai (JP)

( * ) Notice: Subject to any disclaimer, the term of this patent is extended or adjusted under 35 U.S.C. 154(b) by 307 days.

(21) Appl. No.: 16/495,117

(22) PCT Filed: Mar. 23, 2018

(86) PCT No.: PCT/JP2018/011867
§ 371 (c)(1),
(2) Date: Sep. 18, 2019

(87) PCT Pub. No.: WO2018/181050
PCT Pub. Date: Oct. 4, 2018

(65) Prior Publication Data
US 2020/0088902 A1 Mar. 19, 2020

(30) Foreign Application Priority Data
Mar. 28, 2017 (JP) .............................. JP2017-062204

(51) Int. Cl.
*G01V 3/08* (2006.01)
*G05D 1/02* (2020.01)

(52) U.S. Cl.
CPC ........... *G01V 3/081* (2013.01); *G05D 1/0259* (2013.01); *G05D 2201/0213* (2013.01)

(58) Field of Classification Search
CPC .......... G01V 15/00; G01V 3/08; G01V 3/081; G05D 1/0259; G05D 1/0261; G05D 1/0263; G05D 1/0265; G05D 2201/0213
(Continued)

(56) References Cited

U.S. PATENT DOCUMENTS 5,191,528 A * 3/1993 Yardley ................ G05D 1/0272
701/23
5,524,723 A * 6/1996 Gramling ............. G05D 1/0265
104/286

(Continued)

FOREIGN PATENT DOCUMENTS

CN 1909010 A * 2/2007
CN 201867965 U * 6/2011
(Continued)

OTHER PUBLICATIONS

Byun et al., Vehicle Position Estimation Based on Magnetic Markers: Enhanced Accuracy by Compensation of Time Delays.sensors ISSN 1424-8220 www.mdpi.com/journal/sensors. Sensors 2015, 15, 28807-28825 (Year: 2015).*
(Continued)

*Primary Examiner* — Patrick Assouad
*Assistant Examiner* — Sean Curtis
(74) *Attorney, Agent, or Firm* — Xsensus LLP

(57) ABSTRACT

In a marker detection method for detecting magnetic markers (10) laid in a road by sensor units (11) attached to a vehicle (5), in a marker detection system (1) including two sensor units (11) arranged so as to be separated in a longitudinal direction of the vehicle (5) and two magnetic markers (10) arranged at spacings equal thereto so as to be simultaneously detectable by the two sensor units (11), magnetism generation sources simultaneously detected by
(Continued)

the two sensor units (11) are detected as the magnetic markers (10), thereby reducing erroneous detection.

8 Claims, 10 Drawing Sheets

(58) Field of Classification Search
USPC ................................................ 324/227
See application file for complete search history.

(56) References Cited

U.S. PATENT DOCUMENTS

| | | | | |
|---|---|---|---|---|
| 5,951,610 | A * | 9/1999 | Nagai | G05D 1/0261 701/23 |
| 5,957,983 | A * | 9/1999 | Tominaga | B62D 1/28 701/23 |
| 6,035,248 | A * | 3/2000 | Nagai | G05D 1/0261 180/167 |
| 6,336,064 | B1 * | 1/2002 | Honkura | B62D 15/025 701/23 |
| 6,512,978 | B2 * | 1/2003 | Suzuki | G01C 21/26 180/168 |
| 6,971,464 | B2 * | 12/2005 | Marino | B60T 7/16 180/167 |
| 8,433,467 | B2 * | 4/2013 | Ross-Martin | G05D 1/0255 701/23 |
| 9,234,877 | B2 * | 1/2016 | Hattersley | G01R 33/10 |
| 9,239,314 | B2 * | 1/2016 | Hattersley | G01N 27/745 |
| 9,278,691 | B1 * | 3/2016 | Zsombory | G08G 1/167 |
| 9,523,748 | B2 * | 12/2016 | Hattersley | G01R 33/1276 |
| 9,892,296 | B2 * | 2/2018 | Kovarik | G06K 7/10376 |
| 10,078,770 | B2 * | 9/2018 | Kovarik | G05D 1/0261 |
| 10,632,892 | B2 * | 4/2020 | Yamamoto | E01F 9/30 |
| 10,801,170 | B2 * | 10/2020 | Yamamoto | E01F 11/00 |
| 10,867,139 | B2 * | 12/2020 | Kovarik | E01F 9/30 |
| 10,968,581 | B2 * | 4/2021 | Yamamoto | G08B 21/00 |
| 10,969,245 | B2 * | 4/2021 | Yamamoto | G05D 1/0259 |
| 11,057,752 | B2 * | 7/2021 | Yamamoto | G01C 21/26 |
| 2007/0270628 | A1 * | 11/2007 | Kawano | A61B 1/041 600/12 |
| 2014/0266174 | A1 * | 9/2014 | Hattersley | G01N 27/745 324/243 |
| 2015/0247719 | A1 * | 9/2015 | Huang | B62D 15/025 701/41 |
| 2016/0082957 | A1 * | 3/2016 | Zsombory | G08G 1/167 701/1 |
| 2016/0124057 | A1 * | 5/2016 | Hattersley | G01R 33/0213 324/234 |
| 2018/0157878 | A1 * | 6/2018 | Kovarik | E01F 9/578 |
| 2018/0283904 | A1 * | 10/2018 | Yamamoto | B62D 15/025 |
| 2018/0305874 | A1 * | 10/2018 | Yamamoto | G01R 33/063 |
| 2018/0305875 | A1 * | 10/2018 | Yamamoto | H01F 1/113 |
| 2019/0018989 | A1 * | 1/2019 | Kovarik | G06K 7/10376 |
| 2019/0031076 | A1 * | 1/2019 | Yamamoto | G05D 1/021 |
| 2019/0098468 | A1 * | 3/2019 | Yamamoto | G01C 21/26 |
| 2019/0155305 | A1 * | 5/2019 | Yamamoto | G08G 1/09 |
| 2019/0194886 | A1 * | 6/2019 | Yamamoto | G05D 1/02 |
| 2019/0212169 | A1 * | 7/2019 | Yamamoto | G08G 1/0104 |
| 2020/0012294 | A1 * | 1/2020 | Yamamoto | G05D 1/0261 |
| 2020/0088902 | A1 * | 3/2020 | Yamamoto | G05D 1/0259 |
| 2020/0133299 | A1 * | 4/2020 | Yamamoto | G05D 1/027 |
| 2020/0247300 | A1 * | 8/2020 | Yamamoto | E01F 9/512 |
| 2020/0284586 | A1 * | 9/2020 | Yamamoto | G08G 1/163 |
| 2020/0285822 | A1 * | 9/2020 | Yamamoto | G08G 1/096783 |
| 2020/0332483 | A1 * | 10/2020 | Michiharu | E01C 23/18 |
| 2020/0340825 | A1 * | 10/2020 | Yamamoto | G08G 1/0141 |
| 2020/0354907 | A1 * | 11/2020 | Yamamoto | G08G 1/042 |
| 2020/0357027 | A1 * | 11/2020 | Yamamoto | G06Q 30/0251 |
| 2021/0025959 | A1 * | 1/2021 | Yamamoto | G01R 33/0017 |
| 2021/0089858 | A1 * | 3/2021 | Yamamoto | G06K 19/08 |
| 2021/0101497 | A1 * | 4/2021 | Schmitt | G05D 1/0261 |
| 2021/0149414 | A1 * | 5/2021 | Yamamoto | G05D 1/0261 |
| 2021/0150905 | A1 * | 5/2021 | Yamamoto | G01V 3/165 |
| 2021/0165419 | A1 * | 6/2021 | Yamamoto | B62D 15/025 |
| 2021/0215507 | A1 * | 7/2021 | Yamamoto | G01C 21/28 |
| 2021/0221359 | A1 * | 7/2021 | Yamamoto | G08G 1/042 |
| 2021/0250738 | A1 * | 8/2021 | Yamamoto | H04W 4/40 |
| 2021/0271261 | A1 * | 9/2021 | Yamamoto | G05D 1/0259 |
| 2021/0278859 | A1 * | 9/2021 | Yamamoto | G01D 5/147 |

FOREIGN PATENT DOCUMENTS

| | | | | |
|---|---|---|---|---|
| CN | 110383359 | A * | 10/2019 | G05D 1/0259 |
| CN | 111919130 | A * | 11/2020 | G01R 33/0017 |
| CN | 111919131 | A * | 11/2020 | G01R 33/0283 |
| CN | 112204352 | A * | 1/2021 | G01C 21/28 |
| CN | 112753054 | A * | 5/2021 | E01F 9/512 |
| CN | 3862988 | A1 * | 8/2021 | G05D 1/02 |
| EP | 1020707 | A1 * | 7/2000 | G01C 21/26 |
| EP | 1046568 | A2 * | 10/2000 | B62D 1/28 |
| EP | 1020707 | B1 * | 1/2003 | B62D 15/025 |
| EP | 3605486 | A1 * | 2/2020 | G05D 1/0259 |
| EP | 3715531 | A1 * | 9/2020 | B60P 3/00 |
| EP | 3731149 | A1 * | 10/2020 | G06K 19/06196 |
| EP | 3742119 | A1 * | 11/2020 | G08G 1/0116 |
| EP | 3742382 | A1 * | 11/2020 | G06Q 20/145 |
| EP | 3779488 | A1 * | 2/2021 | G05D 1/0259 |
| EP | 3779489 | A1 * | 2/2021 | G01R 35/00 |
| EP | 3789985 | A1 * | 3/2021 | G08G 1/146 |
| EP | 3118709 | B1 * | 4/2021 | G05B 19/19 |
| EP | 3805698 | A1 * | 4/2021 | G01C 25/005 |
| EP | 3828659 | A1 * | 6/2021 | G05D 1/0287 |
| EP | 3862988 | A1 * | 8/2021 | E01F 11/00 |
| JP | 8-314540 | A | 11/1996 | |
| JP | H10-105230 | A | 4/1998 | |
| JP | 2001297395 | A * | 10/2001 | |
| JP | 2002-39707 | A | 2/2002 | |
| JP | 2003-295950 | A | 10/2003 | |
| JP | 2005-202478 | A | 7/2005 | |
| JP | 3839678 | B2 * | 11/2006 | G01C 21/28 |
| JP | 2007-213356 | A | 8/2007 | |
| JP | 2007303950 | A * | 11/2007 | |
| JP | 2008196906 | A * | 8/2008 | |
| JP | 4450532 | B2 * | 4/2010 | |
| JP | 2017224236 | A * | 12/2017 | G05D 1/02 |
| JP | 2018010356 | A * | 1/2018 | G01D 5/147 |
| JP | 6365601 | B2 * | 8/2018 | G01D 5/142 |
| JP | 2018165856 | A * | 10/2018 | G08G 1/167 |
| JP | 2019184473 | A * | 10/2019 | G01R 33/022 |
| JP | 2019184474 | A * | 10/2019 | G01R 33/0017 |
| JP | 2019194801 | A * | 11/2019 | G05D 1/0261 |
| JP | WO2019124196 | A1 * | 2/2021 | E01F 11/00 |
| WO | WO-9208176 | A1 * | 5/1992 | G05D 1/0261 |
| WO | WO-2016043782 | A1 * | 3/2016 | B60Q 9/00 |
| WO | WO-2017187879 | A1 * | 11/2017 | G08G 1/096783 |
| WO | WO-2017217423 | A1 * | 12/2017 | E01F 9/30 |
| WO | WO-2018012407 | A1 * | 1/2018 | G01D 5/14 |
| WO | WO-2018181050 | A1 * | 10/2018 | G01V 3/081 |
| WO | WO-2018230422 | A1 * | 12/2018 | G01R 33/02 |
| WO | WO-2018230423 | A1 * | 12/2018 | G01V 3/38 |
| WO | WO-2019124196 | A1 * | 6/2019 | G06K 19/08 |
| WO | WO-2019198602 | A1 * | 10/2019 | G01R 33/022 |
| WO | WO-2019198603 | A1 * | 10/2019 | G01D 5/20 |
| WO | WO-2019211987 | A1 * | 11/2019 | G06K 19/0723 |
| WO | WO-2020138460 | A1 * | 7/2020 | G08G 1/09 |
| WO | WO-2020138465 | A1 * | 7/2020 | G08G 1/09 |
| WO | WO-2020138467 | A1 * | 7/2020 | G01V 3/08 |
| WO | WO-2020138471 | A * | 7/2020 | G01C 21/28 |
| WO | WO-2021100865 | A1 * | 5/2021 | G09B 29/00 |

OTHER PUBLICATIONS

Byun et al., Heading Estimation Based on Magnetic Markers for Intelligent Vehicles.Journal of Dynamic Systems, Measurement, and Control Jul. 2016, vol. 138. Copyright 2016. (Year: 2016).*
EPO Search Report of EP 18777587 (dated 2019).*
International Search on Patentability—PCT/JP2018/011867 (dated 2019).*
Extended European search report dated Nov. 18, 2020, in corresponding European patent Application No. 18777587.9, 8 pages.
International Search Report and Written Opinion dated Jun. 12,

(56) References Cited

OTHER PUBLICATIONS 2018 for PCT/JP2018/011867 filed on Mar. 23, 2018, 6 pages including English Translation of the International Search Report.

* cited by examiner

MARKER DETECTION SYSTEM AND MARKER DETECTION METHOD

CROSS-REFERENCE TO RELATED APPLICATIONS

The present application is based on PCT filing PCT/JP2018/011867, filed Mar. 23, 2018, which claims priority to JP 2017-062204, filed Mar. 28, 2017, the entire contents of each are incorporated herein by reference.

TECHNICAL FIELD

The present invention relates to a marker detection system and marker detection method for detecting magnetic markers laid in a road.

BACKGROUND ART

Conventionally, marker detection systems for vehicles using magnetic markers laid in a road for vehicle control have been known (for example, refer to Patent Literature 1). By using this marker detection system to detect, for example, magnetic markers laid along a lane by a vehicle's magnetic sensor or the like, various driving assists can be achieved, such as automatic steering control, lane departure warning, and automatic driving.

CITATION LIST

Patent Literature

Patent Literature 1: Japanese Unexamined Patent Application Publication No. 2005-202478

SUMMARY OF INVENTION

Technical Problem

However, the above-described conventional marker detection system has the following problem. That is, there is a problem in which reliability of magnetic marker detection may be impaired due to various external disturbances of magnetism acting on the magnetic sensors or the like. For example, a vehicle traveling alongside and an oncoming vehicle passing by can become a generation source of external disturbance of magnetism.

The present invention was made in view of the above-described conventional problem, and is to provide a marker detection system and marker detection method capable of reducing erroneous detection.

Solution to Problem

One aspect of the present invention resides in a marker detection system which detects magnetic markers laid in a road by a magnetic detection unit attached to a vehicle, wherein the system including:

at least two magnetic detection units arranged so as to be separated in a longitudinal direction of the vehicle; and at least two magnetic markers as many as said at least two magnetic detection units and arranged at spacings equal thereto so as to be simultaneously detectable by said at least two magnetic detection units.

One aspect of the present invention resides in a marker detection method for detecting magnetic markers laid in a road by a magnetic detection unit attached to a vehicle, wherein as the magnetic detection units, at least two magnetic detection units arranged so as to be separated in a longitudinal direction of the vehicle are included, as the magnetic markers, at least two magnetic markers as many as said at least two magnetic detection units and arranged at spacings equal thereto so as to be simultaneously detectable by said at least two magnetic detection units are included, and magnetism generation sources simultaneously detected by said at least two magnetic detection units are detected as the magnetic markers.

Advantageous Effects of Invention

The marker detection system according to the present invention is a system including at least two magnetic markers arranged at spacings equal to spacings of said at least two magnetic detection units on a vehicle side. And, the marker detection method according to the present invention detects magnetism generation sources simultaneously detected by said at least two magnetic detection units as the magnetic markers.

For example, when a magnetism generation source resulting from a magnetized fallen object, a magnetism generation source such as a manhole, or the like is present on a road surface, there is a high possibility that only a part of said at least two magnetic detection unit detects the magnetism generation source. Thus, as a condition for detection as the magnetic markers, if a condition is set that they are magnetism generation sources simultaneously detected by said at least two magnetic detection units, the possibility of erroneously detecting a magnetism generation source such as, for example, a fallen object or manhole, as the magnetic marker can be reduced.

As described above, the marker detection system and the marker detection method according to the present invention are a system or method with an excellent characteristic capable of reducing erroneous detection.

DESCRIPTION OF EMBODIMENTS

Figure 1:
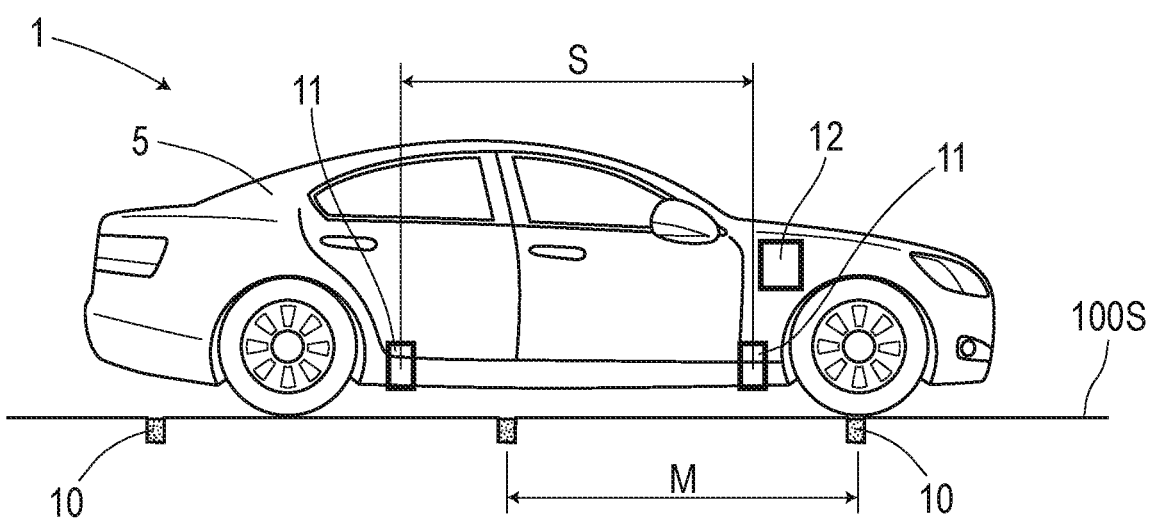
FIG. 1 is a descriptive diagram depicting a marker detection system.

Suitable aspects in the present invention are described.

In the present invention, said at least two magnetic markers are preferably arranged so that magnetic polarities form a predetermined pattern.

When this arrangement is adopted and when a combination of magnetic polarities of magnetism generation sources simultaneously detected by said at least two magnetic detection units matches the predetermined pattern, the magnetism generation sources simultaneously detected by said at least two magnetic detection units are preferably detected as the magnetic markers.

In this case, based on whether magnetic polarities acting on said at least two magnetic detection units have the predetermined pattern, erroneous detection of a magnetism generation source other than the magnetic markers can be effectively reduced. In particular, as for a magnetism generation source exceeding the full length of the vehicle, such as a large iron plate laid on a road surface during road construction or a steel frame of a bridge, there is a possibility that said at least two magnetic detection units simultaneously detect magnetism. If the magnetic polarity pattern is added to conditions, erroneous detection due to a large magnetism generation source as described above can be avoided.

A marker detection system of one suitable aspect in the present invention includes another magnetic detection unit which can detect the magnetic markers but is different from the said at least two magnetic detection units, and the other magnetic detection unit is attached to the vehicle so as not to detect the magnetic markers when said at least two magnetic detection units simultaneously detect said at least two magnetic markers.

If the other magnetic detection unit is adopted, when said at least two magnetic detection units simultaneously detect magnetism generation sources while the other magnetic detection unit does not detect a magnetism generation source, the magnetism generation sources simultaneously detected by said at least two magnetic detection units are preferably detected as the magnetic markers.

In this manner, if a condition is set that said at least two magnetic detection units simultaneously detect magnetism generation sources while the other magnetic detection unit does not detect a magnetism generation source, reliability of detection of the magnetic markers can be improved. This condition is effective particularly for avoiding erroneous detection caused by a magnetism generation source exceeding the full length of the vehicle, such as a large iron plate laid on a road surface during road construction or a steel frame of a bridge.

In the present invention, the respective magnetic markers including said at least two magnetic markers are preferably arranged at substantially constant spacings in a road direction.

In this case, a situation does not occur in which while part of said at least two magnetic detection units at spacings equal to the spacings of said at least two magnetic markers can detect any of the magnetic markers, part of the rest cannot detect any of the magnetic markers. When detecting the magnetic markers, it is imperative that said at least two magnetic detection units simultaneously detect magnetism generation sources.

EMBODIMENTS

Embodiments of the present invention are specifically described by using the following examples.

First Embodiment

The present embodiment is an example regarding a marker detection system 1 for detecting magnetic markers 10 laid in a road and a marker detection method. Details of this are described by using FIG. 1 to FIG. 10.

The marker detection system 1 of the present embodiment is a system as in FIG. 1 for detecting the magnetic markers 10 laid in the road by sensor units 11, which are one example of magnetic detection units, attached to a vehicle 5.

This marker detection system 1 is configured to include two sensor units 11 arranged so as to be separated in a longitudinal direction of the vehicle 5 and two magnetic markers 10 as many as these two sensor units 11 and arranged at spacing equal thereto so as to be simultaneously detectable by these two sensor units 11. In the following, the magnetic marker 10 is described, and then description is made on the sensor unit 11 including magnetic censors Cn (FIG. 3) and a detection unit 12 which determines whether a magnetism generation source is the magnetic marker 10.

Figure 2:
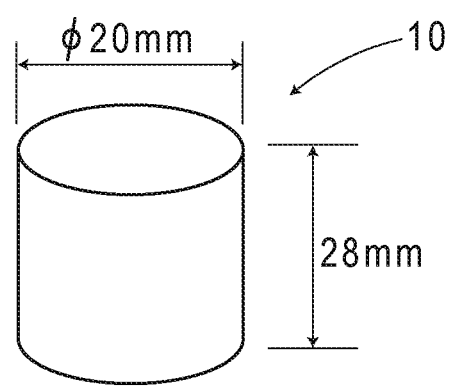
FIG. 2 is a descriptive diagram depicting a magnetic marker.

The magnetic marker 10 is a marker laid in a road surface 100S of a road where the vehicle 5 travels, as in FIG. 1 and FIG. 2. The magnetic markers 10 are arranged at spacings of 2 m along the center of a lane, which indicates a traveling segment of the road. In the following, the spacings of 2 m of the magnetic markers 10 are referred to as a marker span M.

The magnetic marker 10 forms a columnar shape having a diameter of 20 mm and a height of 28 mm, and is laid as being accommodated in a hole provided in the road surface 100S. A magnet forming the magnetic marker 10 is a ferrite plastic magnet formed by dispersing a magnetic powder of iron oxide as a magnetic material in a polymer material as a base material, and has a characteristic of a maximum energy product (BHmax)=6.4 kJ/m$^3$. Note that the magnetic marker 10 is laid in the road surface 100S so that the N pole is on a front surface side.

Part of specifications of the magnetic marker 10 of the present embodiment is provided in Table 1.

TABLE 1

| Type of magnet | Ferrite plastic magnet |
| --- | --- |
| Diameter | φ 20 mm |
| Height | 28 mm |
| Magnetic flux density Gs of the surface | 45 mT |

This magnetic marker 10 can act magnetism of a magnetic flux density of 8 μT (microtesla) at a height of 250 mm, which is an upper limit of a range from 100 to 250 mm assumed as an attachment height of the sensor units 11. Note that a magnetic flux density Gs of the surface of the magnet forming the magnetic marker 10 is 45 mT.

Next, the sensor units 11 and the detection unit 12 configuring the marker detection system 1 are described.

Figure 3:
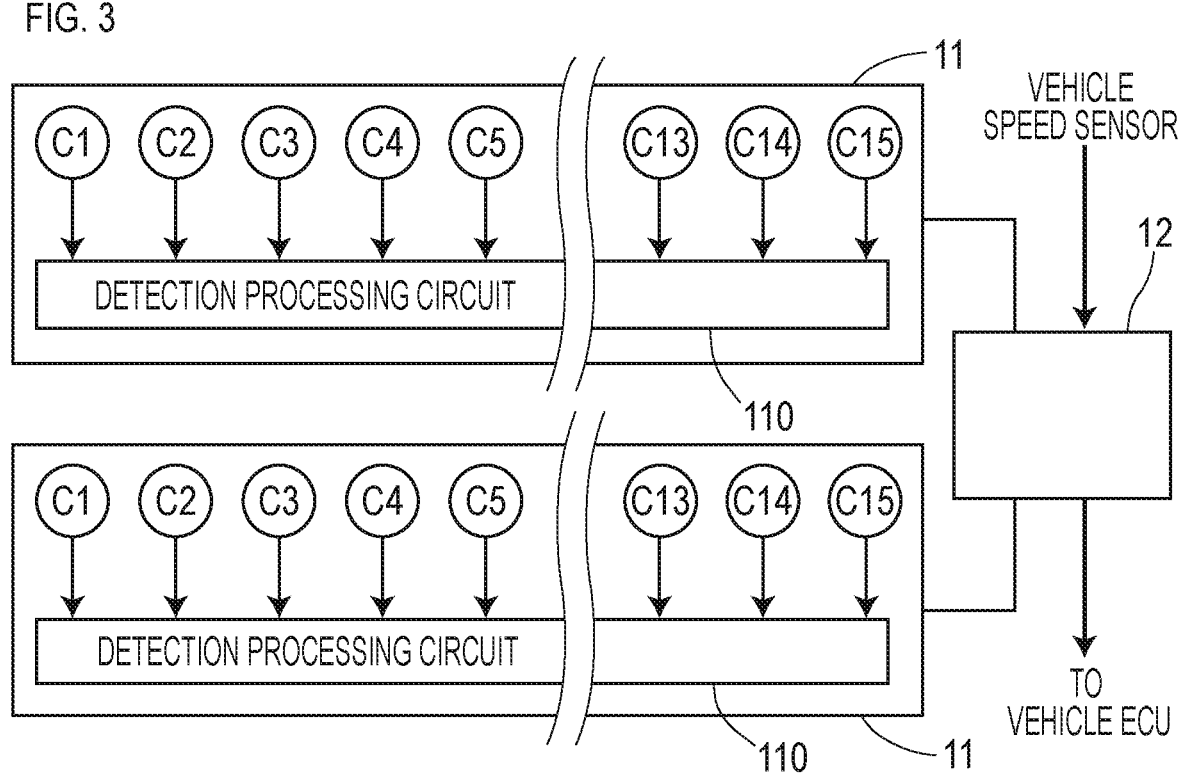
FIG. 3 is a block diagram depicting the configuration of the marker detection system on a vehicle side.
Figure 4:
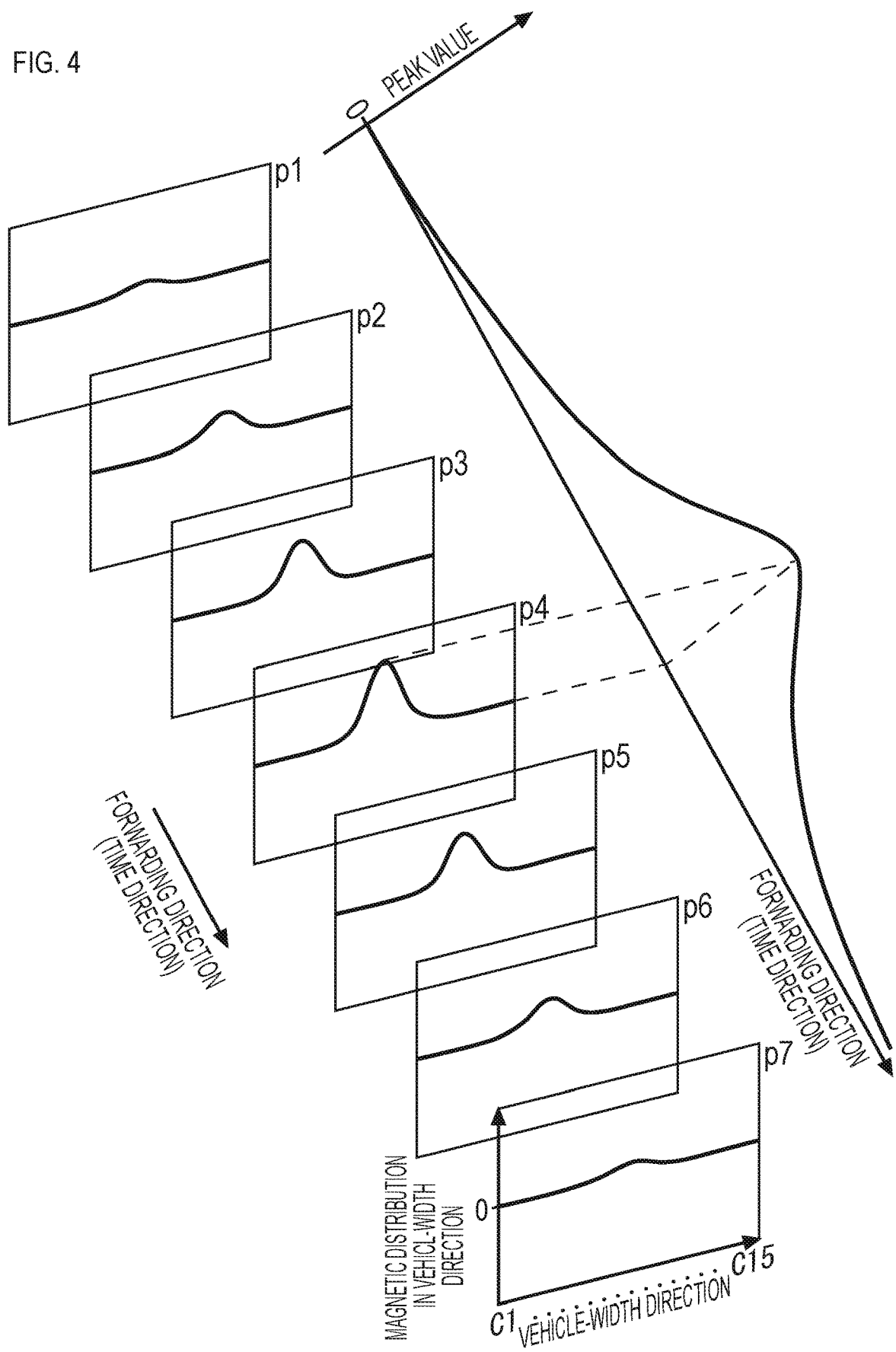
FIG. 4 is a descriptive diagram exemplarily depicting temporal changes of a magnetic distribution in a vehicle-width direction at the time of passage over the magnetic marker.

The sensor units 11 are magnetic detection units to be attached to the bottom surface of the vehicle 5, as in FIG. 1 and FIG. 3. The sensor units 11 are arranged at two locations at a spacing of 2 m (sensor span S) in the longitudinal direction of the vehicle 5. The front-side sensor unit 11 is attached to the rear side of a front axle, and the rear-side sensor unit 11 is attached to the front side of a rear axle. In the case of the vehicle 5 of the present embodiment, each attachment height with reference to the road surface 100S is 200 mm.

Each sensor unit 11 includes fifteen magnetic sensors Cn (n is an integer of 1 to 15) arrayed on a straight line along a vehicle-width direction and a detection processing circuit 110 having a CPU and so forth not depicted incorporated therein (FIG. 3).

The magnetic sensors Cn adopted in the present embodiment are MI sensors which detect magnetism by using the known MI effect (Magneto Impedance Effect) in which the impedance of a magneto-sensitive body such as an amorphous wire sensitively changes in response to the external magnetic field. The magnetic sensors Cn are incorporated in the sensor unit 11 so that the magneto-sensitive bodies are along the vertical direction so as to detect magnetism in the vertical direction.

The magnetic sensors Cn achieve high sensitivity with a measurement range of the magnetic flux density of ±0.6 mT and a magnetic flux density resolution of 0.02 μT within the measurement range. As described above, the magnetic markers 10 act magnetism on the order of 8 μT at 250 mm, which is an upper limit in the range assumed as the attachment height of the sensor units 11. According to the magnetic sensors Cn having a magnetic flux density resolution of 0.02 μT, the magnetism of the magnetic markers 10 can be sensed with high reliability. With the sensor units 11 at the attachment height of 200 mm of the present embodiment, the magnetism of the magnetic markers 10 can be further readily detected.

Part of specifications of the magnetic sensors Cn is provided in Table 2.

TABLE 2

| Measuring range | ±0.6 mT |
|---|---|
| Magnetic flux resolution | 0.02 μT |
| Sampling period | 3 kHz |

The detection processing circuit 110 (FIG. 3) is an arithmetic circuit which performs various arithmetic processes such as a magnetic detection process (detection process) for detecting any magnetic marker 10. This detection processing circuit 110 is configured by using a CPU (central processing unit) which performs various computations as well as memory elements such as a ROM (read only memory) and RAM (random access memory), and so forth. The detection processing circuit 110 acquires sensor signals outputted from each of the magnetic sensors Cn to perform a magnetic detection process and so forth. The magnetic detection result generated by the detection processing circuit 110 is inputted to the detection unit 12.

The detection unit 12 is a unit which controls the front-side and rear-side sensor units 11 and outputs the result of detection of any magnetic marker 10, as in FIG. 1 and FIG. 3. The detection unit 12 includes an electronic substrate (not depicted) having a CPU which performs various computations as well as memory elements such as a ROM and RAM and so forth implemented thereon. To this detection unit 12, in addition to the front-side and rear-side sensor units 11, a vehicle ECU, a vehicle speed sensor for measuring a speed of the vehicle, and so forth are electrically connected.

This detection unit 12 takes in the magnetic detection result of each sensor unit 11, and generates and outputs a marker detection result which is a determination result as to whether the magnetic marker 10 has been detected or the like. The marker detection result is inputted to the vehicle ECU not depicted to be used in various controls on the vehicle side, such as automatic steering control, lane departure warning, and automatic driving for keeping the lane.

The detection unit 12 uses the magnetic detection results of the front-side sensor unit 11 and the rear-side sensor unit 11 to perform a marker detection process for magnetic marker detection and so forth. Then, the marker detection result is generated, which is a determination result or the like as to whether the magnetic marker 10 has been detected, and is inputted to the vehicle ECU.

Next, (1) a magnetic detection process for each sensor unit 11 to detect a magnetism generation source is described, and then (2) a marker detection process by the detection unit 12 is described.

(1) Magnetic Detection Process

The front-side and rear-side sensor units 11 perform a magnetic detection process at a frequency of 3 kHz by control of the detection unit 12. For every execution period (p1 to p7) of the magnetic detection process, each sensor unit 11 samples a magnetic measurement value indicated by a sensor signal of each of fifteen magnetic sensors Cn to acquire a magnetic distribution in the vehicle-width direction (refer to FIG. 4). A peak value in this magnetic distribution in the vehicle-width direction becomes maximum at the time of passage over a magnetism generation source such as the magnetic marker 10 (period p4 in FIG. 4).

Figure 5:
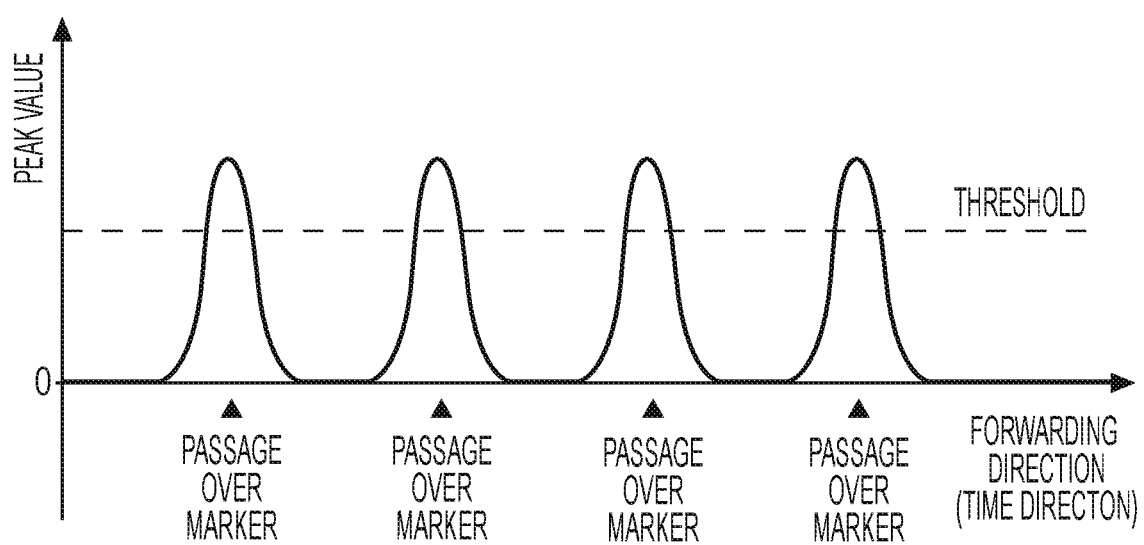
FIG. 5 is a descriptive diagram exemplarily depicting temporal changes of a peak value of a magnetic measurement value at the time of passage over the magnetic marker.
Figure 6:
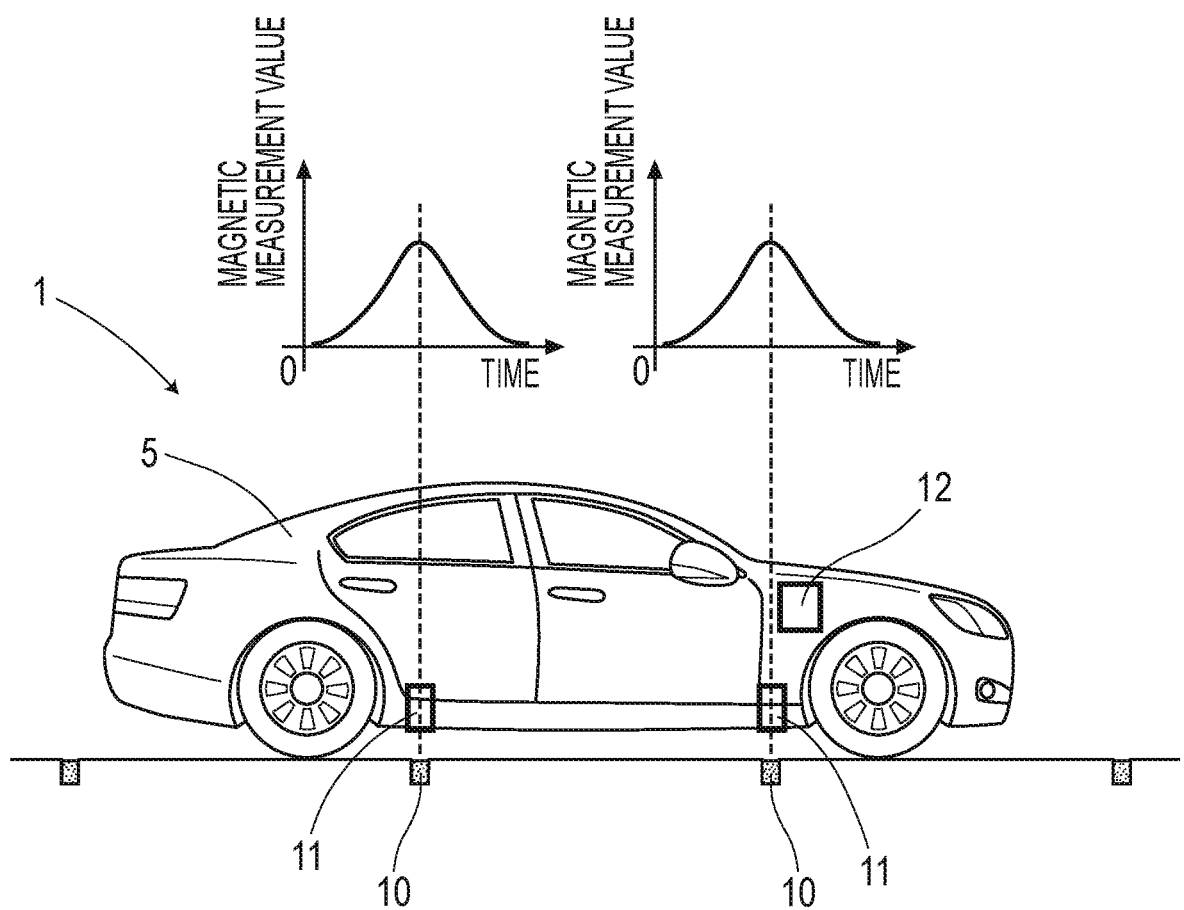
FIG. 6 is a descriptive diagram of a marker detection process.

When the vehicle 5 travels along the lane where the magnetic markers 10 are laid, the peak value of the magnetic distribution in the vehicle-width direction appears at every passage over the magnetic marker 10 as in FIG. 5. The sensor unit 11 makes a threshold determination regarding this peak value and, when it is equal to or larger than a predetermined threshold, determines that a magnetism generation source that is likely to be the magnetic marker 10 has been detected.

Note that when the sensor unit 11 detects a magnetism generation source, it is identified which magnetic measurement value of any of the magnetic sensors Cn is a peak value. Then, a positional shift amount of the peak value in the vehicle-width direction of the magnetic sensor Cn from the center position of the sensor unit 11 is identified, and is measured as a lateral shift amount of the vehicle 5 with respect to the magnetic marker 10.

(2) Marker Detection Process

The detection unit 12 controls the front-side sensor unit 11 and the rear-side sensor unit 11 to acquire each magnetic detection result. Then, based on a combination of the acquired two magnetic detection results, the detection unit 12 performs a marker detection process for detecting the magnetic marker 10.

When the rear-side sensor unit 11 detects a magnetism generation source at the same time when the front-side sensor unit 11 detects a magnetism generation source, the detection unit 12 determines that each magnetism generation source is the magnetic marker 10. As exemplarily depicted in FIG. 6, when the front-side and rear-side sensor units 11 each reach straight above the magnetic marker 10, as exemplarily depicted in graphs in the drawing each illustrating temporal changes of the magnetic measurement value, the magnetic measurement values of the respective sensor units 11 simultaneously become peak values. When the magnetic measurement values of the respective sensor units 11 simultaneously become peak values, the detection unit 12 determines that each magnetism generation source is the magnetic marker 10.

Note that simultaneity of detection time of magnetism generation sources by the front-side and rear-side sensor units 11 does not mean strictly physical simultaneity. For example, in a temporal range in which the vehicle 5 travels with a spacing on the order of 0.5 m, which is ¼ of the marker span M of 2 m, the front-side and rear-side sensor units 11 do not detect the same magnetism generation source. Thus, in the marker detection process, simultaneity is determined when the front-side and rear-side sensor units 11 each detect a magnetism generation source in this temporal range.

Specifically, of the front-side and rear-side sensor units 11, with reference to a detection time (first time) of one sensor unit 11 which momentarily in advance detects a magnetism generation source, the detection unit 12 sets a temporal range required for the vehicle to travel 0.5 m as a detection period. If a detection time (second time) of the other sensor unit 11 which detects a magnetism generation source is included in this detection period, it can be regarded that the front-side and rear-side sensor units 11 simultaneously detected magnetism generation sources. In this case, the detection unit 12 determines each of the magnetism generation sources simultaneously detected by the front-side and rear-side sensor units 11 as the magnetic marker 10. Note that the time of momentarily in advance detecting a magnetism generation source means a detection time strictly earlier in time between detection times treated by the detection unit 12 as simultaneous as described above.

On determining that the magnetism generation sources detected by each sensor unit 11 are the magnetic markers 10, the detection unit 12 inputs the marker detection result that the magnetic marker 10 has been detected to the vehicle ECU. Note that, at this time, the detection unit 12 simultaneously inputs the lateral shift amount measured by each sensor unit 11 as described above. The vehicle ECU acquiring the lateral shift amounts as well as the indication that the magnetic markers 10 have been detected can perform driving assist control such as lane following control by using the lateral shift amounts as control inputs.

On the other hand, if either of the sensor units 11 detects a magnetism generation source but the other sensor unit 11 cannot simultaneously detect a magnetism generation source, the detection unit 12 determines that the magnetism generation source detected by said either of the sensor units 11 is not the magnetic marker 10 and there is a possibility of erroneous detection.

Figure 7:
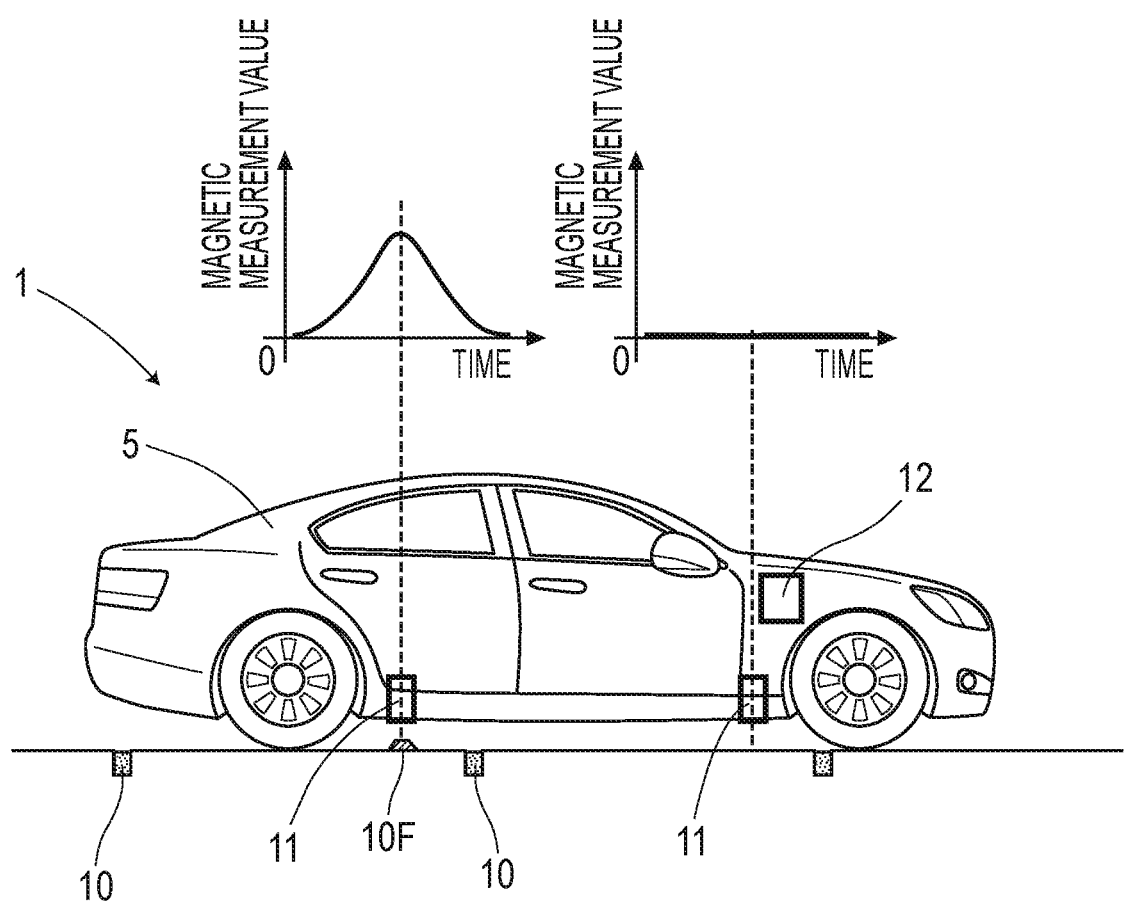
FIG. 7 is a descriptive diagram of a marker detection process at the time of passage over a magnetism generation source other than the magnetic marker.
Figure 8:
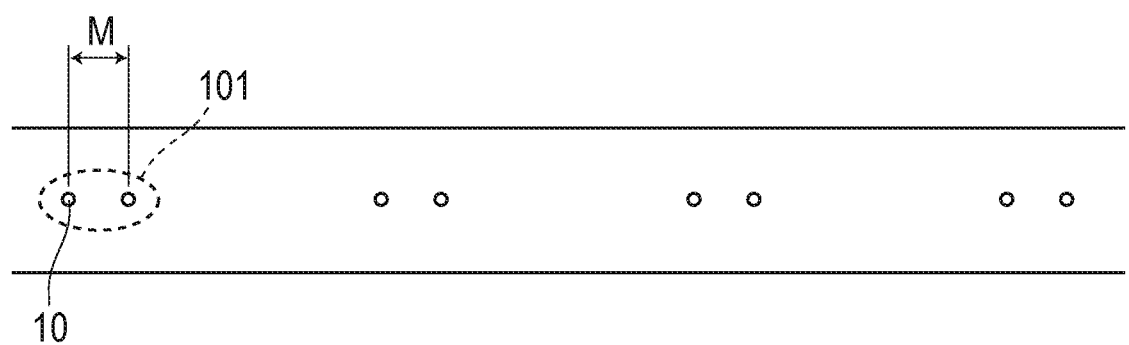
FIG. 8 is a descriptive diagram of another laying pattern of magnetic markers.

This situation can occur when, for example, as in FIG. 7, either of the sensor units 11 detects magnetism of a magnetism generation source 10F other than the magnetic marker 10. In this case, while the magnetic measurement value of the rear-side sensor unit 11 becomes a peak value, the magnetic measurement value of the front-side sensor unit 11 remains low. Here, the detection unit 12 determines that magnetism detected by the rear-side sensor unit 11 derives from the magnetism generation source 10F other than the magnetic marker 10.

As described above, in the marker detection system 1 of the present embodiment, the marker span M on a road side and a sensor span S on a vehicle side match each other. If this configuration is adopted, when the front-side and rear-side sensor units 11 simultaneously detect magnetism generation sources, these magnetism generation sources can be determined as the magnetic markers 10.

When either one of the sensor units 11 detects a magnetism generation source while the other sensor unit 11 does not detect a magnetism generation source, it can be determined that the possibility is high that the detected magnetism generation source is not the magnetic marker 10. According to this determination, it can be determined that the possibility is high that the magnetism generation source such as a fallen object or manhole is not a magnetic marker, and erroneous detection can be avoided.

Note that the present embodiment is an example in which the magnetic markers 10 are arranged in the road at constant spacings (marker span M). In place of this, as in FIG. 8, two magnetic markers 10 separated with the marker span M may be laid in one laying location 101, and laying locations 101 may be arranged at spacings of 10 m, 20 m, or the like longer than the marker span M. As for the present embodiment in which the magnetic markers 10 are laid at constant spacings (marker span M=2 m), this can be restated as a configuration example in which the laying locations 101 each having two magnetic markers 10 arranged are successively provided at spacings of 2 m.

Furthermore, the number of magnetic markers 10 per laying location may be three or more. In this case, the spacings of the magnetic marker 10 may be equal or inequal. On the vehicle 5 side, the sensor units 11 as many as the number of the magnetic markers 10 per laying location may be attached at the same spacings.

Figure 9:
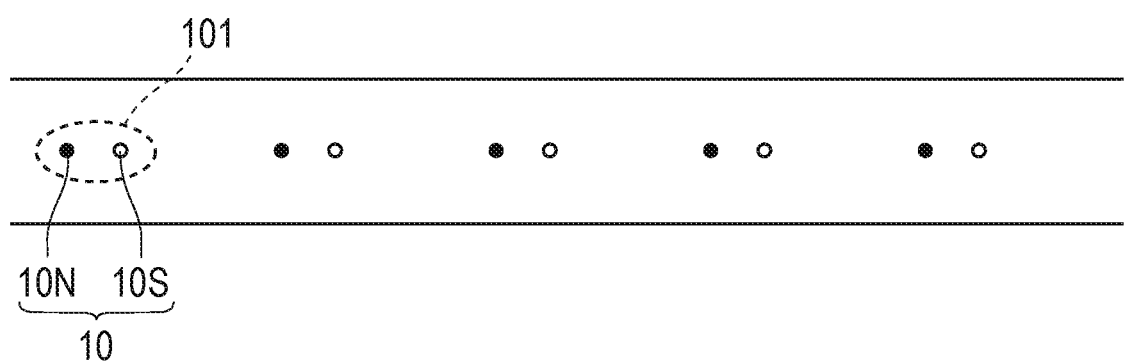
FIG. 9 is a descriptive diagram of a pattern of magnetic polarities of the magnetic marker.

As in FIG. 9 in which an N-pole magnetic marker 10N is indicated by a black circle and an S-pole magnetic marker 10S is indicated by a white circle, a configuration may be made so that magnetic polarities of the magnetic markers 10 on a front surface side form a predetermined pattern. In this case, two magnetic markers 10 forming a predetermined magnetic polarity pattern can be simultaneously detected by the front-side sensor unit 11 and the rear-side sensor unit 11. In addition to the condition of simultaneous detection, if a condition is additionally set that magnetic polarities of two magnetic markers simultaneously detected form a predetermined pattern, erroneous detection of a magnetism generation source other than the magnetic marker 10 can further be reduced.

As a magnetic polarity pattern, for example, a pattern of a combination of (N pole-S pole), a pattern of a combination of (S pole-N-pole), and so forth can be thought. Furthermore, the pattern of a combination of magnetic polarities may be changed for each laying location of the magnetic markers. In particular, if a pattern including both of the N pole and the S pole is set, for example, erroneous detection due to a large magnetism generation source which acts uniform magnetism such as a steel frame buried in a bridge, a reinforced-concrete tunnel, or a large iron plate laid on a road surface for road construction can be avoided.

Furthermore, for example, when a pattern of a combination at one laying location is represented with parentheses such as (N pole-N pole), a pattern of (N pole-S pole), (S pole-N pole), (N pole-S pole), (S pole-N pole), . . . may be set for a plurality of successive locations. In this case, among four magnetic markers belonging to adjacent two laying locations, the combination is such that magnetic polarities of inner two magnetic markers are the same, and a pattern of magnetic polarities between different laying locations can be formed. Also, for example, when the N pole is treated as a binary bit 1 and the S pole is treated as a binary bit 0, a pattern at each laying location may be set so as to form a specific data sequence.

Figure 10:
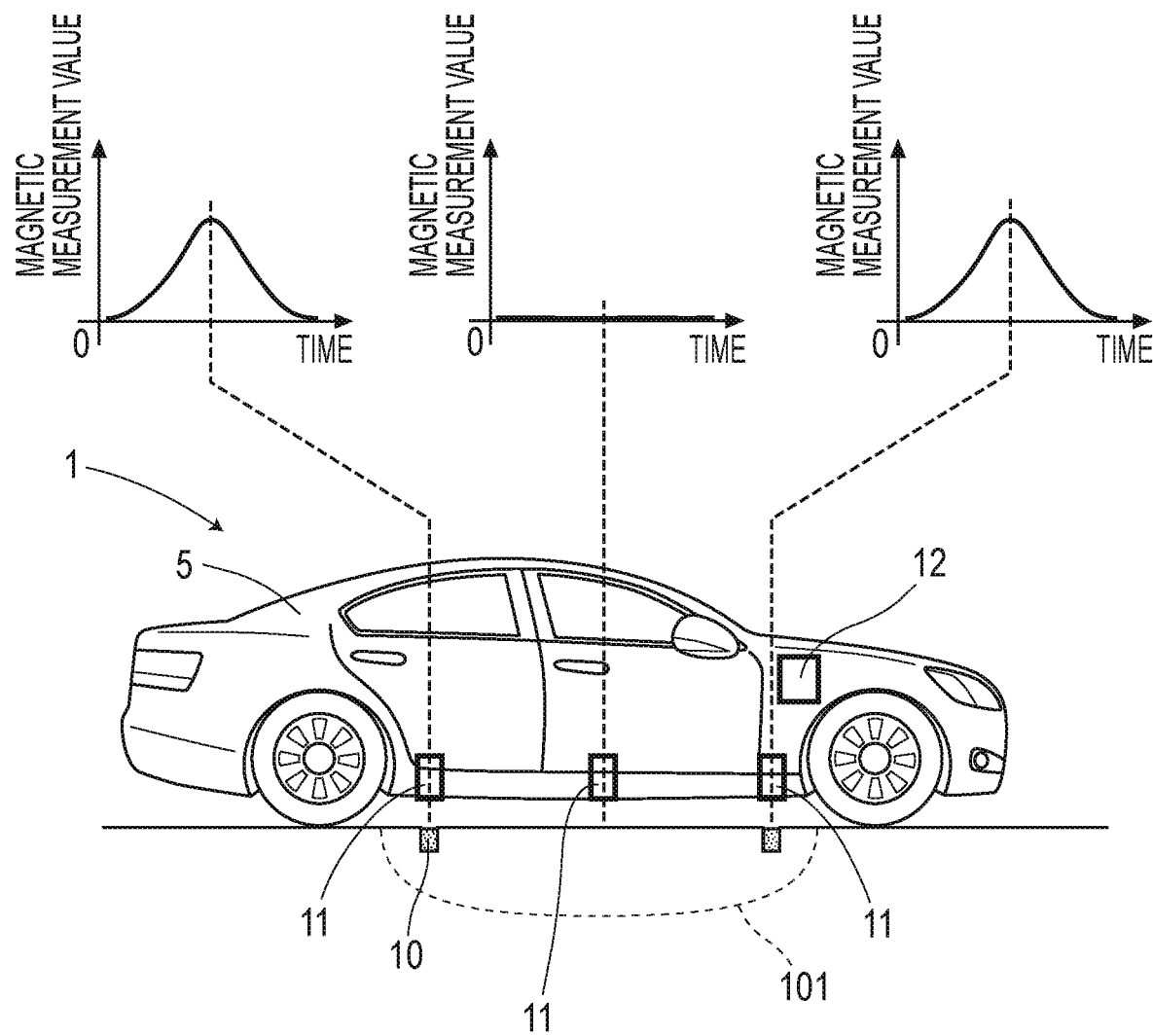
FIG. 10 is a descriptive diagram of a marker detection process by another marker detection system.

As in FIG. 10, while two magnetic markers 10 are laid at each laying location 101, on the vehicle 5 side, two sensor units 11 capable of simultaneously detecting these two magnetic markers 10 may be arranged in the longitudinal direction and another third sensor unit 11 may be arranged in the middle. In this case, as a condition for determining a magnetic marker, a condition may be set that the sensor units 11 on both outer sides simultaneously detect magnetism generation sources while the intermediate sensor unit 11 does not detect a magnetism generation source.

When the vehicle passes over a large magnetism generation source such as a large iron plate laid on a road surface during road construction, a reinforced-concrete tunnel, or a steel frame buried in a bridge; a large vehicle traveling alongside such as a trailer, which may become a magnetism generation source; or the like, there is a possibility that magnetism uniformly acts on all sensor units 11. Thus, as in FIG. 10, a condition may be set that the sensor units 11 on both outer sides simultaneously detect magnetism generation sources while the intermediate sensor unit 11 does not detect a magnetism generation source. If this condition is set, for example, erroneous detection due to a large magnetism generation source which uniformly acts magnetism on each sensor unit 11 can be avoided in advance.

In the present embodiment, the magnetic sensors Cn with sensitivity in the vertical direction are adopted. However, magnetic sensors with sensitivity in a forwarding direction may be used, or magnetic sensors with sensitivity in the vehicle-width direction may be used. Furthermore, for example, magnetic sensors with sensitivity in a biaxial direction of the vehicle-width direction and the forwarding direction, a biaxial direction of the vehicle-width direction and the vertical direction, or a biaxial direction of the forwarding direction and the vertical direction may be adopted. For example, magnetic sensors with sensitivity in a triaxial direction of the vehicle-width direction, the forwarding direction, and the vertical direction may be adopted. If magnetic sensors with sensitivity in a plurality of axial directions are used, the magnitude of magnetism as well as the magnetism acting direction can be measured, and magnetic vectors can be generated. By using a difference between magnetic vectors and a change ratio of the difference in the forwarding direction, magnetism of the magnetic markers 10 and external disturbance of magnetism may be distinguished.

In the present embodiment, the magnetic marker 10 in a columnar shape having a diameter of 20 mm and a height of 28 mm is exemplarily described. However, for example, a magnetic marker in a sheet shape having a thickness on the order of 1 to 5 mm and a diameter on the order of 80 to 120 mm can also be adopted. As a magnet of this magnetic marker, for example, a ferrite rubber magnet, which is a magnet similar to a magnet sheet for business use or to be used in the kitchen or the like, and so forth may be adopted.

In the foregoing, specific examples of the present invention are described in detail as in the embodiment, these specific examples merely disclose examples of technology included in the scope of claims. Needless to say, the scope of claims should not be restrictively construed based on the configuration, numerical values, and so forth of the specific examples. The scope of claims includes techniques acquired by variously modifying, changing, or combining as appropriate the above-described specific examples by using known techniques, knowledge of a person skilled in the art, and so forth.

REFERENCE SIGNS LIST

1 marker detection system
10 magnetic marker
101 laying location
11 sensor unit (magnetic detection unit)
110 detection processing circuit
12 detection unit
5 vehicle

The invention claimed is:

1. A marker detection system, comprising:
a first and a second magnetic detection units configured to detect a plurality of magnetic markers laid in a road, the first and the second magnetic detection units being attached to a vehicle and separated in a longitudinal direction of the vehicle with a distance, the plurality of magnetic markers being arranged at spacings equal to the distance respectively so that two of the plurality of magnetic markers are simultaneously detectable by the first and the second magnetic detection units; and
processing circuitry configured to
set a temporal range in which the first and the second magnetic detection units do not detect a same magnetic marker of the plurality of magnetic markers,
determine whether a second detection time when the second magnetic detection unit detects second magnetism belongs to the temporal range starting from a first detection time when the first magnetic detection unit detects first magnetism, and
in response to determining that the second detection time belongs to the temporal range, determine that the first magnetism and the second magnetism are adjacent magnetic markers of the plurality of magnetic markers.

2. The marker detection system according to claim 1, wherein
the plurality of magnetic markers are arranged so that magnetic polarities of the N pole and the S pole from the plurality of magnetic markers form a predetermined pattern, and
the processing circuitry is configured to determine that the first magnetism and the second magnetism are the adjacent magnetic markers of the plurality of magnetic markers in response to (1) determining that the second detection time belongs to the temporal range, and (2) determining that a combination of the magnetic polarities of the first magnetism and the second magnetism matches the predetermined pattern.

3. The marker detection system according to claim 1, further comprising:
a third magnetic detection unit configured to detect the plurality of magnetic markers, the third magnetic detection unit being attached to the vehicle, wherein
the third magnetic detection unit is separated from the first and second magnetic detection units such that the third magnetic detection unit does not detect any one of the plurality of magnetic markers when the first and second magnetic detection units detect the adjacent magnetic markers.

4. A marker detection method, comprising:
detecting, using a first and a second magnetic detection units, a plurality of magnetic markers laid in a road, the first and the second magnetic detection units being attached to a vehicle and separated in a longitudinal direction of the vehicle with a distance, the plurality of magnetic markers being arranged at spacings equal to the distance respectively so that two of the plurality of magnetic markers are simultaneously detectable by the first and the second magnetic detection units;
setting, using processing circuitry, a temporal range in which the first and the second magnetic detection units do not detect a same magnetic marker of the plurality of magnetic markers;
determining, using the processing circuitry, whether a second detection time when the second magnetic detection unit detects second magnetism belongs to the temporal range starting from a first detection time when the first magnetic detection unit detects first magnetism; and
in response to determining that the second detection time belongs to the temporal range, determining that the first magnetism and the second magnetism are adjacent magnetic markers of the plurality of magnetic markers.

5. The marker detection method according to claim 4, wherein the plurality of magnetic markers are arranged so that magnetic polarities of the N pole and the S pole from the plurality of magnetic markers form a predetermined pattern, and the determining that the first magnetism and the second magnetism are the adjacent magnetic markers of the plurality of magnetic markers is performed in response to (1) determining that the second detection time belongs to the temporal range, and (2) determining that a combination of the magnetic polarities of the first magnetism and the second magnetism matches the predetermined pattern.

6. The marker detection method according to claim 4, further comprising:

detecting, using a third magnetic detection unit, the plurality of magnetic markers, the third magnetic detection unit being attached to the vehicle, wherein the third magnetic detection unit is separated from the first and second magnetic detection units such that the third magnetic detection unit does not detect any one of the plurality of magnetic markers when the first and second magnetic detection units detect the adjacent magnetic markers.

7. The marker detection system according to claim 2, further comprising:

a third magnetic detection unit configured to detect the plurality of magnetic markers, the third magnetic detection unit being attached to the vehicle, wherein the third magnetic detection unit is separated from the first and second magnetic detection units such that the third magnetic detection unit does not detect any one of the plurality of magnetic markers when the first and second magnetic detection units detect the adjacent magnetic markers.

8. The marker detection method according to claim 5, further comprising:

detecting, using a third magnetic detection unit, the plurality of magnetic markers, the third magnetic detection unit being attached to the vehicle, wherein the third magnetic detection unit is separated from the first and second magnetic detection units such that the third magnetic detection unit does not detect any one of the plurality of magnetic markers when the first and second magnetic detection units detect the adjacent magnetic markers.

\* \* \* \* \*